Feb. 24, 1931.  J. J. MURRAY  1,794,198
CARD SEPARATING MECHANISM
Filed March 26, 1929  4 Sheets-Sheet 2

Inventor:
John J. Murray,
by Walter E. Lombard.
Atty.

Inventor:
John J. Murray,
by Walter E. Lombard.
Atty.

Feb. 24, 1931. J. J. MURRAY 1,794,198
CARD SEPARATING MECHANISM
Filed March 26, 1929 4 Sheets-Sheet 4

Inventor:
John J. Murray,
by Walter E. Lombard.
Atty.

Patented Feb. 24, 1931

1,794,193

UNITED STATES PATENT OFFICE

JOHN J. MURRAY, OF ARLINGTON, MASSACHUSETTS

CARD-SEPARATING MECHANISM

Application filed March 26, 1929. Serial No. 350,003.

This invention relates to mechanism for separating the lowest card from a stack thereof within a hopper and depositing said card in a box carried by an endless belt beneath said hopper and said invention has for its object the production of a machine in which each box may have deposited therein a plurality of different cards and all boxes will have exactly the same assortment of cards.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings.

Similar characters indicate like parts throughout the several figures of the drawings.

In the drawings, 10 is the framework of a single unit, a plurality of which are adapted to be secured in alinement to a horizontal platform, the number of units to be installed being determined by the particular work to be performed.

Beyond each end of said alined series of units are two uprights 11, also adapted to be secured to said platform.

These uprights 11 have mounted therein revoluble shafts 12 to each of which are secured two sprocket wheels 13 carrying endless chains 14, these chains 14 being movable in a groove 15 formed in a bed plate 16 secured to the framework 10 of each unit.

Each pair of uprights 11 has also secured thereto a bed plate 17, the upper face of which is alined with the upper face of the bed plate 16.

The sprocket wheels 13 extend upwardly into openings 18 in the bed plates 17.

Secured to the endless chains 14 are a plurality of transversely disposed pushers 19 extending upwardly therefrom.

Adjustably mounted on the bed plates 16 and 17 are guide members 20.

The pushers 19 are adapted to move boxes or similar receptacles 21 along the bed plates 16 and 17 between the oppositely disposed guide members 20.

These guide members 20 are adjustable toward and from each other to accommodate them to boxes of different widths.

The side members of each framework 10 are provided with slots 22 through which clamping bolts 23 extend to lock to said side members a slidable frame 24 having a top plate 25.

The slidable frame 24 has parallel horizontal shoulders 26 coacting with similar shoulders upon the side members of the framework 10 so as to slide thereon.

The top plate 25 has upwardly extending grooved projections 25a into which extend the opposite ends of a carriage 25b, said carriage being slidable endwise relatively to the top plate 25.

The carriage 25b of each slidable frame 24 has extending upwardly therefrom two brackets 26 and two downwardly extending fingers 27, these brackets 26 and fingers 27 being provided with a continuous vertical plane surface 28 against which U-shaped hoppers 29 may be clamped by means of clamp members 30 pivoted at 31 to ears extending from the upwardly extending brackets 26 and engaging flanges 29x on said hoppers 29.

These hoppers 29 may be of various sizes to accommodate stacks of flat articles of various sizes.

For instance, the hopper 29 as shown in the drawings will accommodate a stack of flat articles of a certain size but when a different size of article is to be deposited in the boxes 21, the hopper 29 is removed and replaced by a larger or smaller hopper.

The hoppers 29 are open at the top and bottom and beneath the bottom of each hopper are two revoluble disks 32, portions of which extend beneath the open end of the hopper and support the stack of articles contained in each hopper.

In each hopper is a weight 33 disposed on top of the flat articles and forcing them downwardly into contact with the upper face of the revoluble disks 32.

These disks 32 are secured to vertical shafts 34 revoluble in bearings in the top plate 25 and the arm 35 extending inwardly from the side members of the slidable frame 24.

When a different sized hopper is installed the slidable frame 24 is adjusted to bring the axes of shafts 34 opposite the centers of the sides of said hoppers.

Each revoluble shaft 34 has secured thereto a worm gear 36 which meshes with a worm 37 secured to and rotatable with a horizontal shaft 38.

These shafts 38 are revoluble in bearings 39 on the frame 10 and each has secured to one end thereof a bevel gear 40 in mesh with a bevel gear 41 on a transverse shaft 42 revoluble in bearings 43 in the side members of the frame 10.

To one end of the shaft 42 is secured a pulley 44 or some similar driving member by which said shaft 42 may be rotated.

Figure 1:
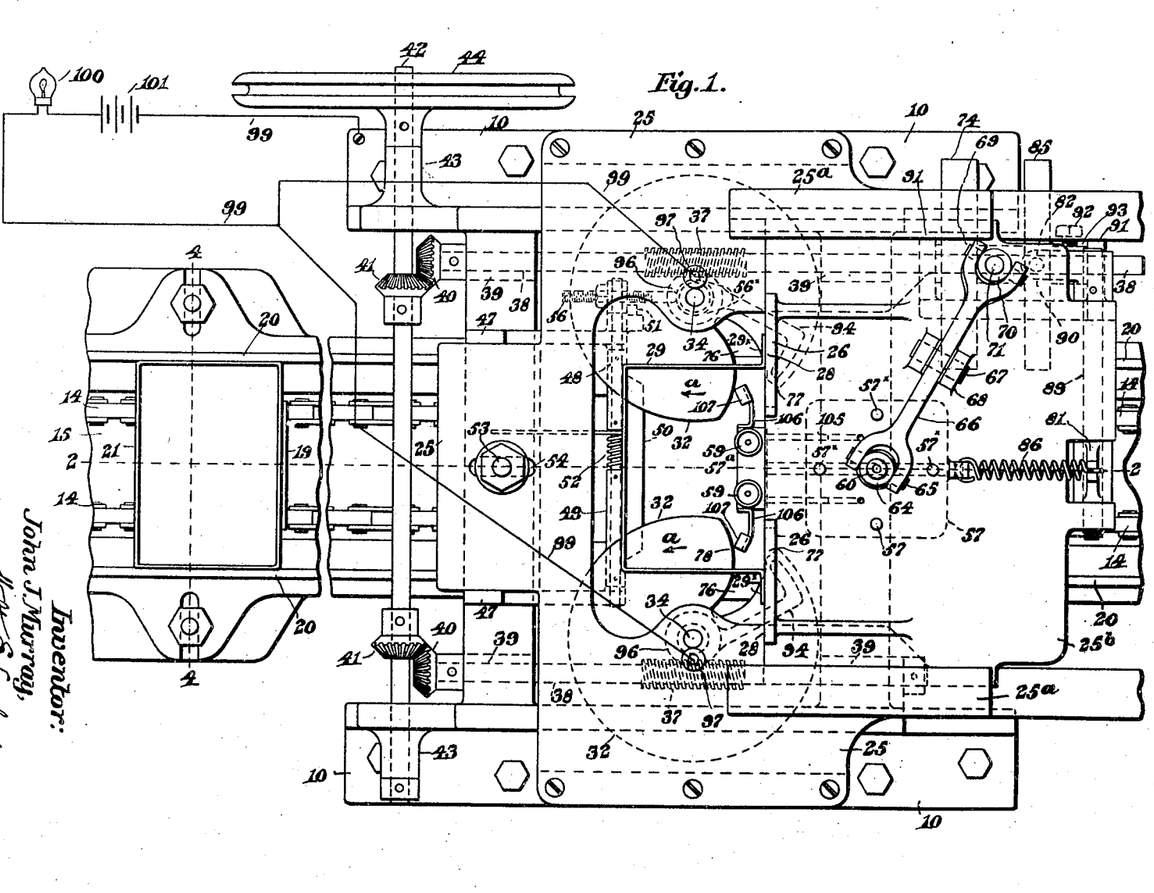
Figure 1 represents a plan of a portion of a machine embodying the principles of the present invention.

When the shaft 42 is revolved rotary movement will be imparted to the shafts 38 and, through the gear mechanism described, cause the disks 32 to be revolved in opposite directions as indicated by the arrows a on Fig. 1 of the drawings.

The axes of the revoluble disks 32 are outside the boundaries of the hopper 29 and always substantially midway of the sides thereof.

Supported by the top plate 25 forming a part of the slidable member 24 is a framework 47 having pivoted thereto at 48 a plate 49 provided with a lip or shelf 50 extending through an opening in the front wall of the hopper 29.

This member 47 is provided with a stop 51 to limit the inward movement of the lip or shelf 50, said plate 49 being normally forced inwardly by means of a spring 52 surrounding the pivot member 48.

The member 47 is provided with a threaded stud 53 extending through a slot 54 in the plate 25, thus providing a means whereby the member 47 may be adjusted toward and from the brackets 26 and fingers 27.

This adjustment is required owing to the various sizes of hoppers used in connection with the various units.

Figures 2, 3:
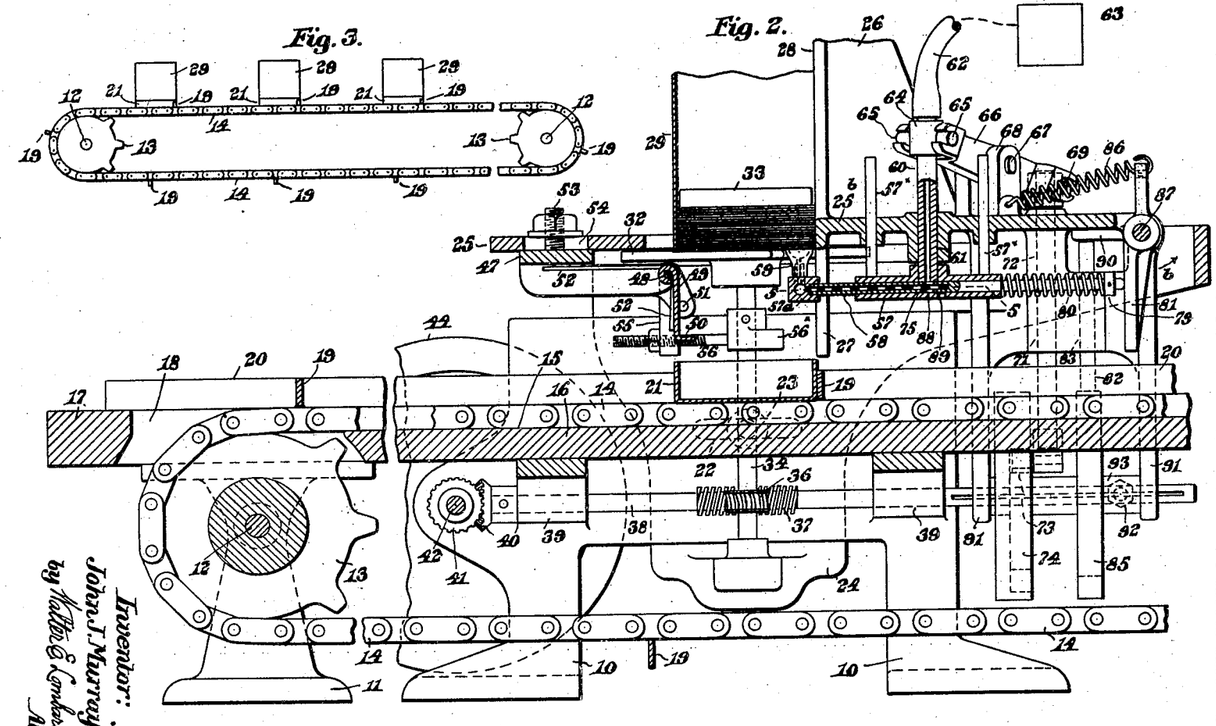
Figure 2 represents a vertical section on line 2, 2, on Fig. 1.
Figure 3 represents a diagrammatic view showing a plurality of hoppers located above the endless conveyor.
Figure 4:
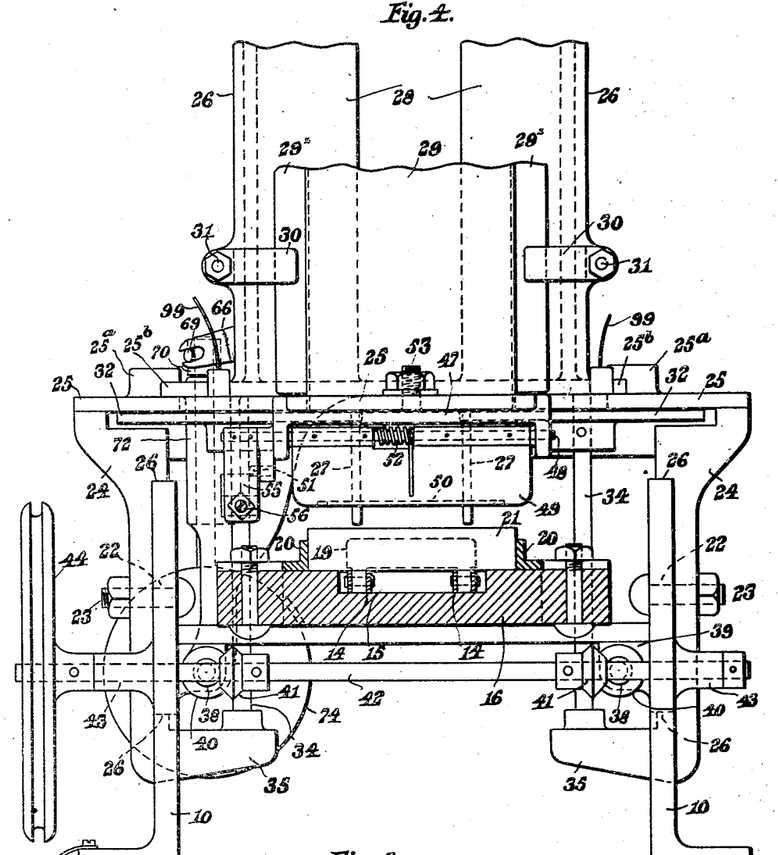
Figure 4 represents a transverse section of the machine on line 4, 4, on Fig. 1.
Figure 5:
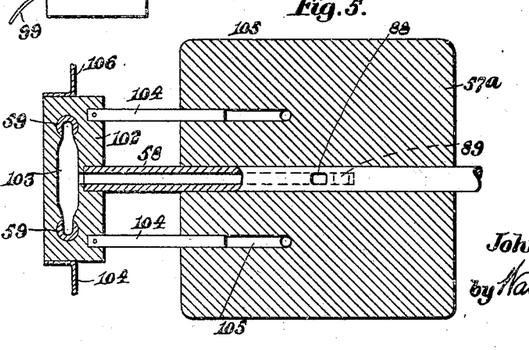
Figure 5 represents a horizontal section on line 5, 5, on Fig. 2.
Figure 6:
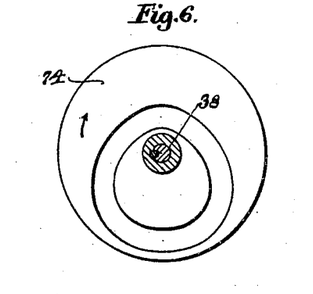
Figure 6 represents an elevation of the cam for actuating the vacuum cup lowering mechanism.
Figure 7:
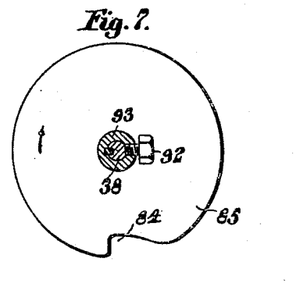
Figure 7 represents an elevation of the cam for actuating the valve controlling the operation of the vacuum cup.
Figure 8:
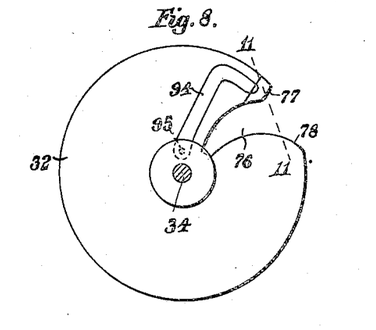
Figure 8 represents an inverted plan of one of the separating disks at the bottom of the card hoppers.
Figure 9:
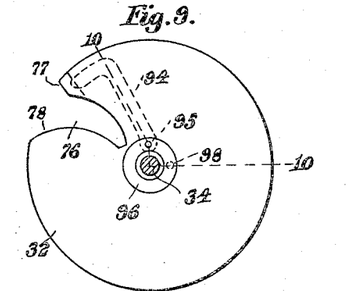
Figure 9 represents a plan of said disk.
Figure 10:
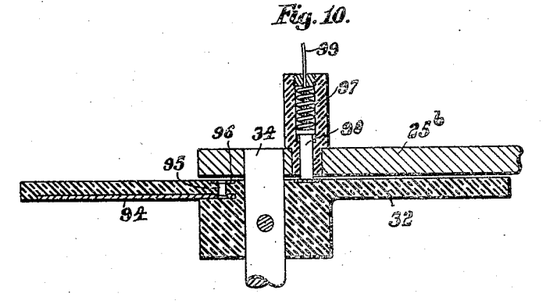
Figure 10 represents a vertical section of said disk, on line 10, 10 on Fig. 9 and showing the brush coacting with the metal plate embedded therein.

It is obvious that regardless of the size of the hopper 29 used, the inner face of the plate 49 must be substantially in alinement with the inner face of the front wall of the hopper, all as shown in Fig. 2 of the drawings.

Secured to the pivot member 48 is a downwardly extending arm 55 having threaded to its lower end a member 56 adapted at each rotation of the disk 32 to be acted upon by a cam member 56x secured to and revoluble with one of the vertical shafts 34.

At the proper time this cam member 56x acting upon the member 56 will move the plate 49 about its pivot causing the lip or shelf 50 to be withdrawn from the hopper 29.

Beneath the carriage 25b of the slidable member 24 is disposed a housing 57 for a tubular valve member 58 one end of which has secured thereto vacuum cups 59 located between said disks 32 and immediately below the lower article in hopper 29.

This housing is provided with rods 57x extending through bearings in the carriage 25b and forming guides for said housing when moved vertically.

The housing 57 has extending upwardly therefrom a tubular member 60 slidable in a bearing 61 formed upon the carriage 25b.

The upper end of the tubular member 60 has a flexible tube 62 extending therefrom to a vacuum pump 63 which may be of any well known construction and therefore is indicated in the drawings only diagrammatically.

The tubular member 60 has a collar 64 thereon provided with oppositely disposed trunnions 65 which extend into slots in the bifurcated end of a lever 66 pivoted at 67 to ears 68 extending upwardly from the carriage 25b.

The opposite end of this lever 66 is also bifurcated and provided with slots into which extend the oppositely disposed trunnions 69 of a collar 70 secured to a rod 71 adapted to move vertically in bearings 72 formed upon the under side of the carriage 25b.

On the lower end of the rod 71 is a roller 73 disposed in the cam path of a cam 74 keyed to one of the shafts 38.

This cam 74 revolves with said shaft and is slidable lengthwise thereof.

The cam path in the cam 74 is so constructed as to move the housing 57 downwardly and then upwardly during each rotation of the disks 32.

The valve 58 has a port 75 therein which communicates with the passage in the tubular member 60 when the vacuum cups 59 are in the position indicated in Fig. 2.

With the pump 63 in operation a suction is created in the vacuum cups tending to draw the lower article in hopper 29 into contact with said cups.

Each disk 32 has a curved slot 76 extending from a point near its center to the edge thereof.

When the slots 76 in the rotation of the disks 32 pass beneath the hopper 29, the suction created in the vacuum cups 59 will draw one end of the lowest article in the hopper 29 downwardly into said slots 76.

The advancing edge 77 of each disk 32 is inclined downwardly and rearwardly and passes over the upper face of the lowest article in the hopper 29 and separates it from those remaining in the hopper.

Figure 11:
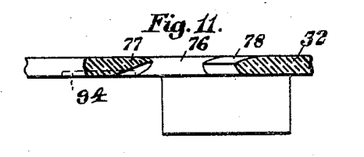
Figure 11 represents a partial section of said disk on line 11, 11 on Fig. 8.

The opposite edge 78 of the slot 76 is curved upwardly and forwardly to facilitate the passage of the article through said slots 76 when opposite each other, all as shown in Fig. 11.

During the passage of the slots 76 beneath the hopper the vacuum cups 59 retain their grip upon said article and when in the rotation of the disks 32 the article has passed through said slots, they continue to retain their grip upon said article.

At this time the cam 74 will operate to lower the housing 57 carrying the flat article downwardly gripped by the vacuum cups 59 and when said cups 59 reach their lowest position, the opposite edge of the flat article will rest upon the lip or shelf 50 of the pivoted plate 49.

When the vacuum cups 59 have reached their lowest position, suitable mechanism is provided to cause the suction to be cut off, air to be admitted to the vacuum cups and then the vacuum cups to be withdrawn from beneath the article, thus permitting the article to drop into the box 21, the lip or shelf 50 at this time being moved outwardly by the action of the cam 56x on the rod 56.

The mechanism for cutting off the vacuum is as follows: The valve 58 has a collar 79 secured thereto and surrounding the valve member between the housing 57 and said collar 79 is a spring 80 normally forcing the outer end of the valve member 58 into contact with the pivoted member 81, the contacting face of which is normally in vertical position as indicated in Fig. 2.

As a consequence, when the housing 57 is moved downwardly the end of the valve member 58 will travel down the vertical face of the pivoted member 81 and during this downward movement the port 75 will continue to be in communication with the passage through the tubular member 60.

When the housing 57 reaches its lowest position the rod 82 movable in bearings 83 in the frame 24 will drop down into the cam throw 84 of the cam member 85, thus permitting the spring 86 to move the member 81 about its pivot 87 in the direction of the arrow b in Fig. 2.

This will permit the spring 80 to act and move the valve member 58 outwardly so that the port 75 will move out of alinement with the passage in the tubular member 60, cutting off further suction from the vacuum cups 59.

When this port 75 has been closed another port 88 will communicate with a vent 89 permitting air to rush into the vacuum cups 59 and thereby sever the grip of said cups 59 upon the article which has been withdrawn from the hopper 29.

As soon as this has been accomplished and the cups 59 withdrawn from beneath the article, the cam throw 84 will act upon the rod 82 and force it upwardly into contact with the lateral arm 90 of the member 81 and return said member 81 into the position indicated in Fig. 2 of the drawings.

The cams 74 and 85 are keyed to one of the horizontal shafts 38 and slidable lengthwise thereof between arms 91 depending from the carriage 25b.

When the carriage 25b has been adjusted to its proper position, it may be locked in such adjusted position by means of the clamping bolt 92 in the hub 93 of the cam 85, said bolt impinging upon the shaft 38 and preventing any further movement of the carriage 25b lengthwise of said shaft.

The disks 32 are preferably made of bakelite or some non-conductor.

Each disk 32 has embedded in its under face a metal plate 94, the inner end of which is electrically connected by a stud 95 with a metal ring 96 embedded in the upper face of the ring around the shaft 34.

Secured to the carriage 25b and extending upwardly therefrom is a housing 97 of insulating material containing a spring-pressed brush 98 which is held in contact at all times with the ring 96.

From each brush 98 extends a wire 99 forming an electric circuit in which is installed a signal light 100 and battery 101.

The vacuum cups 59, between the disks 32, are mounted in a block 102 secured to the valve member 58, the passage of which communicates with a chamber 103 communicating with both vacuum cups 59.

This block 102 is kept in horizontal position by means of the rods 104 extending into recesses 105 formed in the housing 57, the inner ends of which open to atmosphere and thereby prevent any cushioning effect when the block 102 is moved toward the housing 57.

To the opposite ends of the block 102 are secured spring arms 106 which have electric contacts 107 on the outer ends thereof immediately beneath the upper faces of the disks 32.

When a flat article is withdrawn from the hopper 29 through the slots 76 to be later deposited in the box 21, this article will pass between the plates 94 and the electric contact members 107 and prevent said members 107 coming into contact with the plates 94.

If, however, by chance an article should fail to pass through the slots 76 these members 107 will then come into contact with the plates 94 and complete the electric circuit lighting the lamp 100 and indicating to the operator that this particular unit is not functioning properly.

The sprocket wheels 13 are driven intermittently in any well known manner providing for a stop when the boxes 21 reach positions beneath the hoppers 29, but as this feature forms no part of the present invention it is deemed unnecessary to illustrate in the drawings.

The adjustment of the carriage 25b is provided by bringing the hopper 29 in register with the box 21 stopping temporarily beneath said hopper.

The invention is designed primarily for placing an assortment of cards with their envelopes in the boxes 21 so that each box 21 when filled will contain exactly the same assortment.

It is self-evident, however, that the apparatus may be used for other purposes without departing from the scope of the invention.

The various units are complete in themselves and any number of said units may be placed in alinement, it being necessary only to lengthen the endless chain 14 and placing the sprocket wheels 13 further apart.

The driving pulleys 44 of the various units may be driven simultaneously by any well known mechanism which requires no illustration or description.

It is believed that the operation and many advantages of the invention will be understood without further description.

Having thus described my invention, I claim:

1. The combination of a hopper adapted to contain a plurality of flat articles; a pair of rotatable disks at the bottom of said hopper upon which said articles rest adapted to separate the lowest article from those remaining in said hopper, said disks being provided with slots at one side of the centers thereof through which said article is adapted to pass; suction means for gripping said lowest article during the separating operation; a travelling support beneath said hopper; a pivoted member beneath the hopper provided with a lip adapted to support one edge of said article; means for moving said lip from beneath said edge; and means for positioning a box on said travelling support to receive said article when released from said gripping means and supporting lip.

2. The combination of a hopper adapted to contain a plurality of flat articles; a pair of rotatable disks at the bottom of said hopper upon which said articles rest adapted to separate the lowest article from those remaining in said hopper, said disks being provided with slots at one side of the centers thereof through which said article is adapted to pass; suction means for gripping said lowest article during the separating operation, said suction means being provided with an electric contact; a signal light in circuit with said contact; means on said disk adapted to complete the electric circuit at one point in the rotation of said disk; a travelling support beneath said hopper; and means for positioning a box on said support to receive said article when released from said gripping means.

3. The combination of a hopper adapted to contain a plurality of flat articles; a pair of rotatable disks at the bottom of said hopper upon which said articles rest adapted to separate the lowest article from those remaining in said hopper, said disks being provided with slots at one side of the centers thereof through which said article is adapted to pass; suction means for gripping said lowest article during the separating operation; a travelling support beneath said hopper; mechanism for creating a signal whenever an article fails to pass through said slots; a pivoted member beneath the hopper provided with a lip adapted to support one edge of said article; means for moving said lip from beneath said edge; and means for positioning a box on said travelling support to receive said article when released from said lip and gripping means.

4. The combination of a hopper adapted to contain a plurality of flat articles; a pair of rotatable disks at the bottom of said hopper upon which said articles rest adapted to separate the lowest article from those remaining in said hopper, said disks being provided with slots at one side of the centers thereof through which said article is adapted to pass; suction means for gripping said lowest article during the separating operation; a travelling support beneath said hopper; a pivoted spring-pressed member beneath the hopper provided with a lip adapted to support one edge of said article; cam mechanism for moving said lip from beneath said edge;

and means for positioning a box on said support to receive said article when released from said lip and gripping means.

5. The combination of a hopper adapted to contain a plurality of flat articles; a pair of rotatable disks at the bottom of said hopper upon which said articles rest adapted to separate the lowest article from those remaining in said hopper, said disks being provided with slots at one side of the centers thereof through which said article is adapted to pass; suction means for gripping said lowest article during the separating operation; mechanism for moving said suction means downwardly and then horizontally from beneath said hopper; means for admitting air to said suction means prior to its horizontal movement; a travelling support beneath said hopper; and means for positioning a box on said support to receive said article when released from said gripping means.

6. The combination of a hopper adapted to contain a plurality of flat articles; a pair of rotatable separating disks beneath said hopper provided with oppositely disposed slots through which the lowest article is adapted to pass downwardly; a suction cup between said disks adapted to grip said lowest article during the separating operation; a movable lip to support one edge of the article when separated from the remaining articles; means for removing said lip and suction cup from beneath said article; a travelling support; and means for positioning a box on said support to receive said article when released from said lip and gripping means.

7. The combination of a hopper adapted to contain a plurality of flat articles; a pair of rotatable separating disks beneath said hopper provided with oppositely disposed slots through which the lowest article is adapted to pass downwardly; a suction cup between said disks adapted to grip said lowest article during the separating operation; means for temporarily creating a suction in said cup; a movable lip to support one edge of the article when separated from the remaining articles; means for removing said lip and suction cup from beneath said article; a travelling support; and means for positioning a box on said support to receive said article when released from said lip and gripping means.

8. The combination of a hopper adapted to contain a plurality of flat articles; a pair of rotatable separating disks beneath said hopper provided with oppositely disposed slots through which the lowest article is adapted to pass downwardly; a suction cup between said disks adapted to grip said lowest article during the separating operation; a valve controlling the suction in said cup; a movable lip to support one edge of the article when separated from the remaining articles; means for removing said lip and suction cup from beneath said article; a travelling support; and means for positioning a box on said support to receive said article when released from said lip and gripping means.

9. The combination of a hopper adapted to contain a plurality of flat articles; a pair of rotatable separating disks beneath said hopper and forming a support for said articles, said disks being provided with slots at one side of the centers of said disks and through which the lowest article is adapted to pass when said slots are opposite each other; a suction cup between said disks; means for creating a suction in said cup and causing it to grip said lowest article; means for moving said suction cup downwardly while gripping the article; means for stopping the suction when the cup reaches its lowest position; and independent means for subsequently moving said cup from beneath the article when in its lowest position and released from said article.

10. The combination of a hopper adapted to contain a plurality of flat articles; a pair of rotatable separating disks beneath said hopper and forming a support for said articles, said disks being provided with slots at one side of the centers of said disks and through which the lowest article is adapted to pass when said slots are opposite each other; a suction cup between said disks; a reciprocating member having therein a horizontal passage communicating at one end with said cup; a support for said member having a vertical passage therein communicating with the opposite end of said horizontal passage and adapted to be moved downwardly; means for moving said member endwise and cutting off communication between said passages; and means permitting such end movement of said member only when said support has reached its lowest position.

11. The combination of a hopper adapted to contain a plurality of flat articles; a pair of rotatable separating disks at the bottom of said hopper upon which said articles rest, said disks being provided with slots at one side of the centers thereof through which the lowest article is adapted to pass, said centers being opposite the center of said hopper and outside the boundaries thereof; a vacuum cup for gripping said lowest article during the separating operation; a tubular valve communicating with said cup and with a vacuum pump; means for cutting off communication with the pump when the cup reaches its lowest position; means for subsequently moving said vacuum cup horizontally from beneath said hopper; a travelling support beneath said hopper; and means for positioning a box on said support to receive said article when released from said gripping means.

12. The combination of a hopper adapted to contain a plurality of flat articles; a pair of rotatable separating disks at the bottom of said hopper upon which said articles rest, said disks being provided with slots at one side of the centers thereof through which the lowest article is adapted to pass; suction means for gripping said lowest article during the separating operation; means for stopping the suction when said lowest article reaches its lowest position; a travelling support beneath said hopper; a pivoted spring-pressed member beneath the hopper provided with a lip adapted to support one edge of said article; cam mechanism for moving said lip from beneath said edge; and means for positioning a box on said support to receive said article when released from said lip and gripping means.

13. The combination of a hopper adapted to contain a plurality of flat articles; a pair of rotatable separating disks at the bottom of said hopper upon which said articles rest, said disks being provided with slots at one side of the centers thereof through which the lowest article is adapted to pass; suction means for gripping said lowest article during the separating operation; mechanism for moving said suction means downwardly and then horizontally from beneath said hopper; means for stopping the suction when said suction means has reached its lowest position and prior to the horizontal movement of said suction means; a travelling support beneath said hopper; and means for positioning a box on said support to receive said article when released from said gripping means.

14. The combination of a vertical support; a hopper secured to one face thereof adapted to contain a plurality of flat articles; a pair of rotatable disks at the bottom of said hopper upon which said articles rest adapted to separate the lowest article from those remaining in said hopper, said disks being provided with slots at one side of the centers thereof through which said article is adapted to pass, the advancing wall of said slots being beveled downwardly and rearwardly; suction means for gripping said lowest article during the separating operation; a travelling support beneath said hopper; means for positioning a box on said support to receive said article when released from said gripping means; and adjustable guides on opposite sides of said box.

15. The combination of a framework; a frame adjustable endwise thereof; a carriage adjustably mounted on said frame; a hopper on said carriage adapted to contain a plurality of flat articles; a pair of rotatable separating disks at the bottom of said hopper upon which said articles rest, said disks being provided with slots at one side of the centers thereof through which the lowest article is adapted to pass; shafts rotatable in bearings in said frame and to which said disks are secured; means for simultaneously rotating said shafts; suction means for gripping said lowest article during the separating operation; a travelling support beneath said hopper; and means for positioning a box on said support to receive said article when released from said gripping means.

16. The combination of a framework; a frame adjustable endwise thereof; a carriage adjustably mounted on said frame; a hopper mounted on said carriage and adapted to contain a plurality of flat articles; a pair of rotatable separating disks beneath said hopper provided with oppositely disposed slots through which the lowest article is adapted to pass downwardly; vertical shafts for said disks rotatable in bearings in said frame; worm wheels on said shafts; worms meshing therewith; shafts to which said worms are keyed; means for simultaneously rotating said worm shafts; suction means for gripping said lowest article during the separating operation; a travelling support on said framework; and means for positioning a box on said support to receive said article when released from said gripping means.

17. The combination of a framework having a recess extending lengthwise of its upper face; a frame adjustable endwise thereof; a carriage adjustably mounted on said frame; a hopper mounted on said carriage adapted to contain a plurality of flat articles; a pair of rotatable separating disks beneath said hopper provided with oppositely disposed slots through which the lowest article is adapted to pass downwardly; a suction cup between said disks adapted to grip said lowest article during the separating operation; means for temporarily creating a suction in said cup; a movable lip to support one edge of the article when separated from the remaining articles; means for removing said lip and suction cup from beneath said article; a travelling support movable endwise of said recess; and means for positioning a box on said support to receive said article when released from said lip and gripping means.

18. The combination of a hopper adapted to contain a plurality of flat articles; a pair of rotatable separating disks beneath said hopper provided with oppositely disposed slots through which the lowest article is adapted to pass downwardly; rotatable shafts to which said disks are secured; a suction cup between said disks adapted to grip said lowest article during the separating operation; a valve controlling the suction in said cup; a spring actuated lip normally positioned to support one edge of the article when separated from the remaining articles; a cam on one of said disk shafts for removing said lip from beneath said article; means for removing said suction cup from beneath said article; a travelling support; and means for positioning a box on said support to receive said article when released from said lip and gripping means.

19. The combination of a hopper adapted to contain a plurality of flat articles; a pair of rotatable separating disks beneath said hopper and forming a support for said articles, said disks being provided with slots at one side of the centers of said disks and through which the lowest article is adapted to pass when said slots are opposite each other; means for gripping said lowest article to prevent movement thereof during the separating operation and subsequently lowering said article and releasing the grip thereon; independent means for withdrawing said gripping means horizontally from beneath said hopper after said article has been released and means for positioning a box beneath said hopper to receive the article when released.

Signed by me at 294 Washington St., Boston, Massachusetts, this 22nd day of March, 1929.

JOHN J. MURRAY.